(12) United States Patent
Breuer et al.

(10) Patent No.: US 9,272,618 B2
(45) Date of Patent: Mar. 1, 2016

(54) MISFUELLING PREVENTION DEVICE FOR A FILLER NECK OF A FUEL TANK

(71) Applicant: Volkswagen Aktiengesellschaft, Wolfsburg (DE)

(72) Inventors: Thorsten Breuer, Osnabrueck (DE); Christian Scharping, Tuelau (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 14/143,646

(22) Filed: Dec. 30, 2013

(65) Prior Publication Data

US 2014/0110405 A1 Apr. 24, 2014

Related U.S. Application Data

(63) Continuation of application No. PCT/EP2012/002571, filed on Jun. 19, 2012.

(30) Foreign Application Priority Data

Jun. 29, 2011 (DE) .......................... 10 2011 107 361
Dec. 9, 2011 (DE) .......................... 10 2011 120 787

(51) Int. Cl.
*B60K 15/077* (2006.01)
*B60K 15/04* (2006.01)

(52) U.S. Cl.
CPC ................ *B60K 15/077* (2013.01); *B60K 15/04* (2013.01); *B60K 2015/0461* (2013.01); *B60K 2015/0483* (2013.01)

(58) Field of Classification Search
CPC .................................................... B60K 15/077

USPC ............ 141/286, 311 R, 312, 348, 349, 350, 141/351, 352, 356, 363, 367, 369, 370, 372, 141/390; 220/4.14, 86.2, 86.4
See application file for complete search history.

(56) References Cited

U.S. PATENT DOCUMENTS 2,006,748 A * 7/1935 Ritz-Woller ................. 220/86.3
5,195,566 A * 3/1993 Ott et al. ....................... 141/312
5,437,317 A * 8/1995 Takatsuka et al. ........... 141/312

(Continued)

FOREIGN PATENT DOCUMENTS

DE 10 2007 036 397 A1 10/2008
DE 10 2008 039 150 A1 2/2010

(Continued)

*Primary Examiner* — Timothy L Maust
*Assistant Examiner* — Andrew Schmid
(74) *Attorney, Agent, or Firm* — Muncy, Geissler, Olds & Lowe, P.C.

(57) ABSTRACT

A misfuelling prevention device for a filler neck of a fuel tank includes a tubular element with an inflow side and an outflow side and a closure element, which, when in an open state, permits a flow of fuel through the outflow side, and, when in a closed state, prevents a flow of fuel through the outflow side. In a shell surface of the tubular element there is formed at least one opening which permits a flow of fuel from an inner side of the tubular element through to an outer side of the tubular element. The tubular element can be mounted such that at least a part of the shell surface in which the at least one opening is formed is arranged spaced apart from an inner surface of the filler neck such that fuel flowing through the at least one opening can flow via the filler neck into the fuel tank.

14 Claims, 3 Drawing Sheets

(56) References Cited

U.S. PATENT DOCUMENTS

| | | | |
|---|---|---|---|
| 5,615,793 A * | 4/1997 | Muller | 220/295 |
| 5,740,842 A * | 4/1998 | Maier et al. | 141/45 |
| 6,019,348 A * | 2/2000 | Powell | 251/144 |
| 6,230,918 B1 * | 5/2001 | Huynh et al. | 220/300 |
| 6,308,852 B1 * | 10/2001 | Hagano et al. | 220/293 |
| 6,637,477 B1 * | 10/2003 | Maier | 141/350 |
| 8,746,480 B2 * | 6/2014 | Wholey | 220/86.3 |
| 2002/0040740 A1 * | 4/2002 | Ozawa | 141/351 |
| 2002/0088801 A1 * | 7/2002 | Temmesfeld | 220/86.2 |
| 2003/0075543 A1 * | 4/2003 | Hagano | 220/255 |
| 2005/0051236 A1 * | 3/2005 | Watson | 141/370 |
| 2005/0155671 A1 * | 7/2005 | McClung et al. | 141/350 |
| 2006/0096662 A1 * | 5/2006 | King et al. | 141/367 |
| 2008/0308182 A1 * | 12/2008 | Fowler | 141/370 |
| 2009/0020182 A1 * | 1/2009 | Groom et al. | 141/349 |
| 2009/0145516 A1 * | 6/2009 | Wells et al. | 141/367 |
| 2009/0321441 A1 * | 12/2009 | Horlacher et al. | 220/86.2 |
| 2011/0132906 A1 * | 6/2011 | Miller et al. | 220/86.2 |
| 2011/0315682 A1 * | 12/2011 | Tsiberidis | 220/86.2 |
| 2013/0001226 A1 * | 1/2013 | Breuer et al. | 220/86.2 |
| 2013/0008899 A1 * | 1/2013 | Hisadomi et al. | 220/86.2 |
| 2013/0074987 A1 * | 3/2013 | Breuer et al. | 141/311 R |
| 2013/0092290 A1 * | 4/2013 | Waymire et al. | 141/286 |
| 2013/0168392 A1 * | 7/2013 | Kuyama et al. | 220/86.2 |
| 2014/0110405 A1 * | 4/2014 | Breuer et al. | 220/86.2 |

FOREIGN PATENT DOCUMENTS

| | | | |
|---|---|---|---|
| DE | 10 2008 040 715 A1 | 2/2010 | |
| DE | 10 2009 009 998 A1 | 8/2010 | |
| EP | 1502794 A2 * | 2/2005 | B60K 15/04 |
| FR | 2 943 585 A1 | 10/2010 | |
| WO | WO 2007/066296 A1 | 6/2007 | |
| WO | WO 2008/032147 A1 | 3/2008 | |
| WO | 10 2008 003 656 A1 | 10/2009 | |
| WO | WO 2010/094508 | 8/2010 | |
| WO | WO 2010/113063 A1 | 10/2010 | |

\* cited by examiner

MISFUELLING PREVENTION DEVICE FOR A FILLER NECK OF A FUEL TANK

This nonprovisional application is a continuation of International Application No. PCT/EP2012/002571, which was filed on Jun. 19, 2012, and which claims priority to German Patent Application Nos. DE 10 2011 107 361.6 and DE 10 2011 120 787.6, which were filed in Germany on Jun. 29, 2011 and Dec. 9, 2011, respectively, and which are all herein incorporated by reference.

BACKGROUND OF THE INVENTION

1. Field of the Invention

The present invention relates to a misfuelling prevention device for a filler neck of a fuel tank, and also concerns a filler neck with a misfuelling prevention device.

2. Description of the Background Art

Motor vehicles such as passenger cars or transportation vehicles may be operated with gasoline or diesel, depending on the type of internal combustion engine used. In the event of misfuelling, for example when a diesel vehicle is filled with gasoline, the vehicle can sustain substantial damage when it is operated. Moreover, substantial costs can arise for emptying the fuel system after misfuelling has occurred.

In order to prevent misfuelling, the filler necks of fuel tanks are fitted with misfuelling prevention devices. Discharge pipes of delivery nozzles at gas stations have predetermined inside and outside diameters that depend on the fuel. Misfuelling prevention devices can prevent insertion of an unsuitable discharge pipe of a delivery nozzle on the basis of these geometric characteristics.

In this context, a safety element for a diesel fuel tank to prevent misfuelling is known from WO 2010/094508 A1, which corresponds to US 20110315682 (A1). The safety element comprises an insert element that can be installed in a filler neck of a vehicle fuel tank. The insert element has an elongated, tubular holding element, which can fit into the filler neck, with an inflow side and an outflow side. Held in the holding element is a shaped part that is elongated with respect to the holding element and whose free end face, which projects towards the inflow side, has a smaller outside diameter than the inside diameter of a discharge pipe of a diesel delivery nozzle while also having a larger outside diameter than the inside diameter of a discharge pipe of a gasoline delivery nozzle. In addition, an actuating element is provided that can be displaced coaxially to the filler opening on the inside wall of the holding element; this element is arranged so as to remain behind the face of the shaped part in the direction of the tank interior. During its displacement toward the interior of the tank, the actuating element is able to actuate a shutter arranged on the outflow side of the holding element.

In a misfuelling prevention element of this nature, problems can arise when fueling the vehicle from ordinary commercial fuel cans. In like manner, fuelling with delivery nozzles that provide the correct fuel but have the wrong discharge pipe diameter (too big or too small) at the delivery nozzle due to misassembly at the gas station may be hampered or prevented. A funnel can disable the misfuelling prevention in this case. However, a disadvantage here is that the funnel is wetted with diesel after use, and when subsequently stored in the vehicle can emit odor and diesel, thereby contaminating the passenger compartment or trunk.

In this context, a filler neck for a motor vehicle fuel tank is known from DE 10 2008 040 715 A1. The filler neck comprises a fueling opening for inserting a gas pump nozzle, a filling tube leading to the fuel tank, a misfuelling protection element located between the fueling opening and the filling tube, and an emergency fueling channel connecting the fueling opening and filling tube. The flow capacity of the emergency fueling channel is lower than the fueling speed of the fueling system of a gas station. The misfuelling protection can have a closure element that unblocks the filler neck only when the discharge pipe of a permissible gas pump nozzle is inserted, and otherwise blocks the filler neck. Examples of known closure elements include folding, pivoting, sliding, single-piece, and multiple-piece flap arrangements.

SUMMARY OF THE INVENTION

It is therefore an object of the present invention to provide a misfuelling prevention element that permits emergency fuelling with, for example, ordinary commercial fuel cans or delivery nozzles having the wrong discharge pipe diameter. An additional object of the present invention is to provide a retrofittable misfuelling prevention element with the above-described characteristic that can be used in vehicles that were shipped from the factory with no misfuelling prevention system.

In an embodiment, a misfuelling prevention device for a filler neck of a fuel tank is provided. The misfuelling prevention device comprises a tubular element with an inflow side and an outflow side. The inflow side and the outflow side are located on end faces of the tubular element, and define a longitudinal direction between the inflow side and the outflow side. A closure element is mounted on the outflow side of the tubular element. In an open state, the closure element permits a flow of fuel through the outflow side of the tubular element, and in a closed state it obstructs a flow of fuel through the outflow side. Formed in a lateral surface of the tubular element is at least one opening that permits a flow of fuel from an inside of the tubular element through the lateral surface to an outside of the tubular element. The tubular element can be mounted in the filler neck of the fuel tank in such a manner that at least a part of the lateral surface of the tubular element in which the at least one opening is formed is arranged relative to an inner surface of the filler neck such that fuel that flows through the at least one opening in the lateral surface can flow through the filler neck into the fuel tank. Consequently, fuel can be conducted into the fuel tank through the misfuelling prevention device and the filler neck even when the closure element is closed. In this way, the fuel tank can be filled with fuel from a fuel can, for example, even when the discharge pipe of the fuel can is not suitable for opening the closure element of the misfuelling prevention device. Since the misfuelling prevention device can be placed in the filler neck of the fuel tank, the misfuelling prevention device can also be retrofitted in the filler neck in order to prevent misfuelling of the motor vehicle with an incorrect fuel type.

According to an embodiment, the misfuelling prevention device additionally comprises a tubular actuating element that is arranged coaxially within the tubular element. The tubular element is arranged to be movable in the longitudinal direction within the tubular element and is designed such that it can move the closure element into the opened state as a result of actuation by a discharge pipe of a fuel pump nozzle that is inserted into the tubular element. Formed in a lateral surface of the tubular actuating element is at least one opening that permits a flow of fuel from an inside of the tubular actuating element to an outside of the tubular actuating element. The tubular actuating element can have essentially the same diameter as the discharge pipe of a fuel dispensing nozzle, for example. When the discharge pipe of the fuel dispensing nozzle is inserted into the misfuelling prevention device, which is to say into the tubular element, the tubular actuating element can be moved in the longitudinal direction as a result of this action, in order to thereby open the closure element of the misfuelling prevention device. If a fuel dispensing nozzle with an unsuitable diameter is used in conjunction with the misfuelling prevention device, the discharge pipe either does not fit into the tubular element or is not able to actuate the tubular actuating element in order to open the closure element on account of a diameter that is too small. In this way, misfuelling of the fuel tank can be prevented. Because of the opening in the tubular actuating element, however, fuel can flow through the lateral surface of the tubular actuating element even when the closure element is closed, and from there can continue through the at least one opening of the tubular element into the filler neck, and from there into the fuel tank. By this means, the fuel tank can also be fueled using a discharge pipe of a fuel can, for example.

The at least one opening of the tubular element can be offset from the at least one opening of the tubular actuating element, for example. In this way, a flow rate through the openings can be reduced, and at the same time a venting function can be achieved through a swirling of the delivered fuel. A total cross-section of the openings in the tubular element or a total cross-section of the openings in the tubular actuating element can be chosen such that a flow rate through the total cross-section is lower than a minimum flow rate of a fuel dispensing facility. In this way, misfuelling of the fuel tank with fuel from a fuel dispensing facility can be prevented reliably, since the delivery nozzle of the fuel dispensing facility automatically shuts off due to the excessively low flow rate of the fueling process. This intuitively communicates to the user that the fueling process is not proceeding properly. By contrast, when fueling the fuel tank from a gas can, an appropriately slow fueling of the fuel tank can be carried out even when the discharge pipe of the gas can does not fit.

According to another embodiment, the misfuelling prevention device additionally comprises a tubular locking element that is arranged coaxially within the tubular actuating element. The tubular locking element has a smaller outside diameter than the inside diameter of a discharge pipe of a fuel delivery nozzle that is suitable for use in conjunction with the misfuelling prevention device. As a result, the discharge pipe is thus inserted into the tubular element during insertion into the misfuelling prevention device, and at the same time the tubular locking element is inserted into the discharge pipe. In this process, the end face of the discharge pipe strikes the tubular actuating element and moves it in the longitudinal direction in order to open the closure element. As a result, fuel can flow through the now opened outflow side into the fuel tank. A discharge pipe of a fuel delivery nozzle that is not suitable for use in conjunction with the misfuelling prevention device has a diameter that is too big, for example, and thus does not fit into the tubular element, or has an inside diameter that is too small and thus cannot be passed over the tubular locking element. As a result, opening of the closure element is impossible, and reliable misfuelling prevention can be ensured. The tubular locking element can have, in a lateral surface, at least one opening that permits a flow of fuel from an inside of the tubular locking element to an outside of the tubular locking element. In this way, the misfuelling prevention device can be bypassed with a low flow rate, for example when filling the fuel tank from a gas can, by the means that fuel from a discharge pipe of the gas can flows into the tubular locking element and through the opening of the tubular locking element, the opening of the tubular actuating element, and the opening of the tubular element into the filler neck, and ultimately into the fuel tank.

The misfuelling prevention device can have a fastening mechanism to couple the misfuelling prevention device to the filler neck. The fastening mechanism can be actuatable from an inside of the tubular element. In this way, the misfuelling prevention device can be easily retrofitted in a filler neck of a fuel tank. For example, the fastening mechanism can have metal tabs that can be bent outward from the inside of the tubular element in order to secure the misfuelling prevention device in the filler neck. Alternatively, the misfuelling prevention device can also be coupled to the filler neck by means of a press fit. Furthermore, the fastening mechanism can be set to a first state in which the misfuelling prevention device is removable from the filler neck, and to a second state in which the misfuelling prevention device is rigidly coupled to the filler neck. Preferably, the fastening mechanism is selectively adjustable to the first or second state from the inside of the tubular element. In this way, the misfuelling prevention device can easily be mounted in the filler neck, and if necessary can also be removed from the filler neck again.

According to an embodiment of the present invention, another misfuelling prevention device for a filler neck of a fuel tank is provided. The misfuelling prevention device comprises a tubular element with an inflow side and an outflow side, a closure element that is mounted on the outflow side of the tubular element, and a fastening mechanism for detachably coupling the misfuelling prevention device to the filler neck. In an open state, the closure element permits a flow of fuel through the outflow side of the tubular element, and in a closed state it obstructs a flow of fuel through the outflow side. The closure element has at least one opening that permits a flow of fuel from an inside of the tubular element to an outside of the tubular element when the closure element is in the closed state. As described above, the closure element can prevent misfuelling with a fuel delivery nozzle that delivers an unsuitable fuel, by which means misfuelling of the fuel tank is reliably prevented. However, fuel can be delivered to the fuel tank through the opening in the closure element with a low flow rate even when the closure element is closed. By this means, the fuel tank can be fueled using a discharge pipe of a fuel can, for example with an unsuitable discharge pipe. As a result of the fastening mechanism, which makes it possible to detachably mount the misfuelling prevention device in the filler neck, even a vehicle that was shipped from the factory with no misfuelling prevention device can be retrofitted with a misfuelling prevention device. Because the fastening mechanism permits a detachable coupling of the misfuelling prevention device to the filler neck, the misfuelling prevention device can also be removed from the filler neck again if necessary. This removal can be carried out by a user of the vehicle. To this end, the fastening mechanism can, for example, be set to a first state in which the misfuelling prevention device is removable from the filler neck, and to a second state in which the misfuelling prevention device is rigidly coupled to the filler neck. The fastening mechanism can include latching hooks, for example, that can be actuated from an inside of the tubular element in order to set the fastening mechanism to the first and second states. Other fastening mechanisms, such as a force fit or press fit, are likewise suitable.

The opening in the closure element can be dimensioned such that an unpressurized flow rate of fuel through the at least one opening, which is to say a flow rate resulting solely from gravity, is lower than a minimum flow rate of a fuel dispensing facility. In this way, misfuelling from a fuel dispensing facility through the opening of the closure element can be prevented reliably, since in this case the flow rate falls below the minimum flow rate of the fuel dispensing facility, and thus the fuel dispensing facility automatically shuts off. However, fueling with the aid of a gas can is even possible at the low flow rate.

Furthermore, the misfuelling prevention device can have an opening in the closure element in addition to one or more openings in the tubular element and in the tubular actuating element and the tubular locking element. In other words, the features of the misfuelling prevention device described above can be combined with one another. In this case, it is especially advantageous for the total cross-section of the at least one opening of the tubular element and the opening of the closure element to be chosen such that the flow rate through these two openings is lower than a minimum flow rate of a fuel dispensing facility in order to ensure reliable shutoff of a fuel dispensing facility when fuel flows through only these openings with the closure element closed.

Finally, according to the present invention a filler neck of a fuel tank having the above described misfuelling prevention device is provided. In addition, according to the present invention a motor vehicle is provided that includes the above described filler neck and a fuel tank that is coupled to the filler neck.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
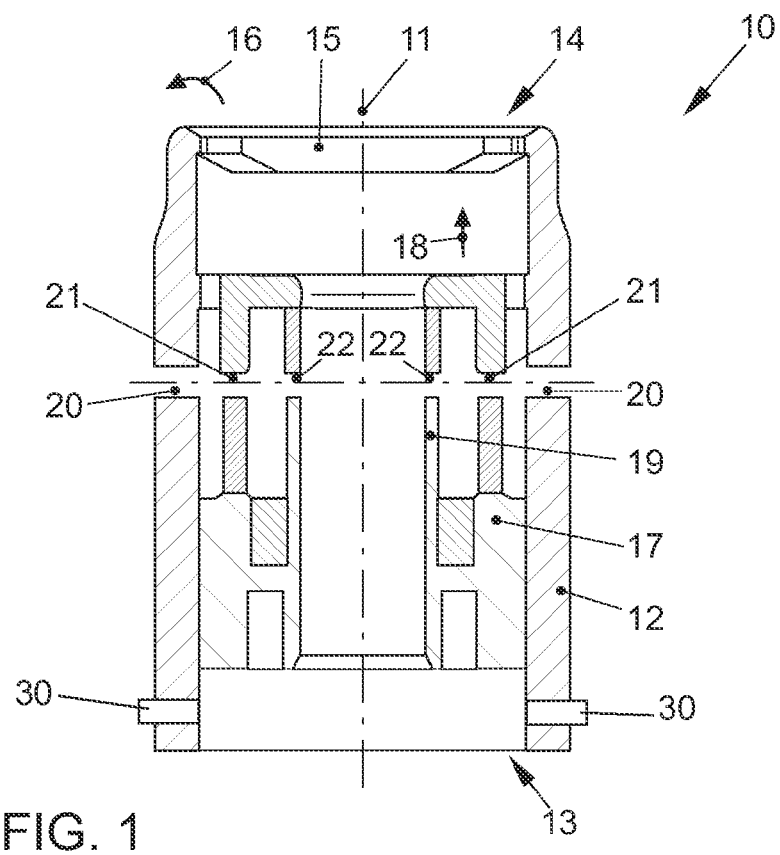
FIG. 1 shows a lateral cross-sectional view of a misfuelling prevention device according to an embodiment of the present invention.

FIG. 1 shows a misfuelling prevention device 10 in a cross-sectional representation along a longitudinal axis 11. The misfuelling prevention device 10 comprises a tubular element 12 with an inflow side 13 and an outflow side 14. A closure element 15 is located on the outflow side 14. A discharge pipe of a gas pump nozzle is inserted into the tubular element 12 in the direction of the arrow 18 from the filling side 13. The closure element 15 can be, for example, a flap that obstructs flow of fuel through the outflow side 14 in a closed state and can be swung open about a hinge axis (not shown) in the direction of the arrow 16 in order to permit a flow of fuel through the outflow side 14. Arranged in the tubular element 12 is a tubular actuating element 17 that is movable in the direction of the longitudinal axis 11 within the tubular element 12. The tubular actuating element 17 can be moved in the direction of the arrow 18, for example when the discharge pipe of the gas pump nozzle is inserted into the tubular element 12 in order to push the closure element 15 into its opened state. The tubular actuating element 17 and/or the closure element 15 can be spring-loaded in such a manner that the closure element 15 is moved into its closed state when the discharge pipe of the gas pump nozzle is removed from the tubular element 12. The misfuelling prevention device additionally includes a tubular locking element 19 that is arranged coaxially inside the tubular actuating element 17 or coaxially inside the tubular element 12. The locking element 19 has a smaller outside diameter than an inside diameter of the discharge pipe of the fuel dispensing nozzle. As a result, the locking element 19 can be inserted into the discharge pipe when the discharge pipe is inserted.

The misfuelling prevention device 10 is used in a filler neck of a fuel tank in such a manner that the outflow side 14 points toward the fuel tank and the inflow side 13 points toward a filler cap or filler door of the vehicle. When a discharge pipe of a gas pump nozzle that fits the misfuelling prevention device 10 is inserted into filler neck, the discharge pipe is inserted into the tubular element 12, and in this process the tubular locking element 19 is inserted into an interior of the discharge pipe. An end face of the discharge pipe strikes the tubular actuating element 17 and moves it in the direction of the arrow 18 in order to thus open the shutter 15. In this state, fuel can be delivered from the discharge pipe through the outflow side 14 into the fuel tank or fuel container. If the outside diameter or inside diameter of the discharge pipe does not fit the tubular element 12 or the tubular locking element 19, the discharge pipe cannot be inserted into the misfuelling prevention device 10, and the shutter 15 remains closed.

Openings 20-22 are formed in the tubular element 12, as well as the actuating element 17 and the locking element 19; these openings make it possible for fuel to flow from inside the locking element 19, the actuating element 17, or the tubular element 12 through the openings 20-22 into a region outside the tubular element 12. Since the tubular element 12 is located in a filler neck of a fuel tank, the fuel ultimately flows through the openings 20 into the filler neck, and from there continues into the fuel tank. This makes it possible for fuel from a discharge pipe that does not fit the misfuelling prevention device 10 and hence is unable to open the shutter 15 to nonetheless flow into the tank. This may be necessary when the vehicle is fueled with the aid of a gas can that does not have a matching discharge pipe, for example. The openings 20-22 are selected in terms of their cross section such that only a low flow rate can be achieved through the openings 20-22. The low flow rate here is chosen such that it is lower than typical minimum flow rates of fuel dispensing facilities. This prevents fueling through the openings 20-22 with unsuitable fuel from a fuel dispensing facility, since the gas pump nozzle of the fuel dispensing facility automatically shuts off and thus inhibits the flow of fuel.

Figure 2:
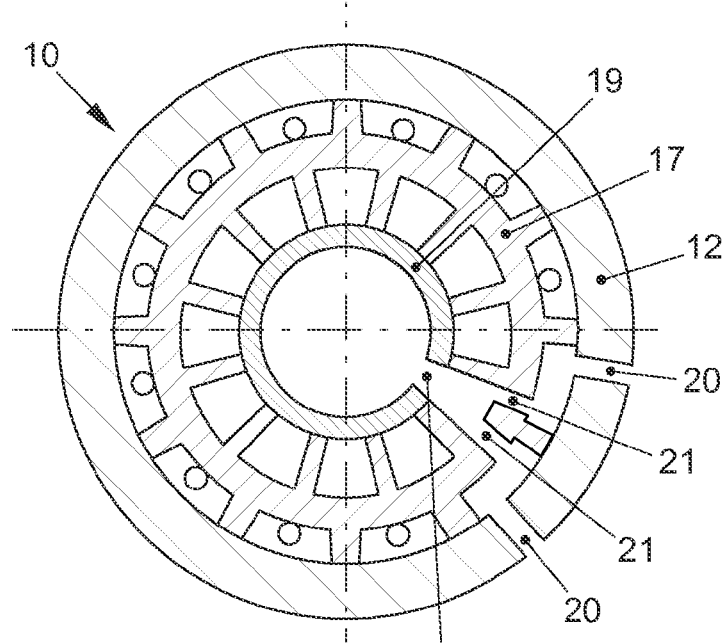
FIG. 2 shows another cross-sectional view of the misfuelling prevention device from FIG. 1.

FIG. 2 shows the misfuelling prevention device 10 in a cross-sectional view in a section plane perpendicular to the longitudinal axis 11. Identical reference symbols in FIGS. 1 and 2 refer to identical elements. As is evident from FIG. 2, two openings 20 are formed in the tubular element 12, two openings 21 are formed in the tubular actuating element 17, and two openings 22 are formed in the tubular locking element 19. The openings 20-22 are arranged offset from one another so that a flow of fuel through the openings 20-22 is swirled and thus its velocity is reduced. Furthermore, a venting function can be achieved via the labyrinthine arrangement of the openings 20-22 and the resulting swirling of the fuel. Moreover, additional openings can be formed in the elements 12, 17, and 19.

Figure 3:
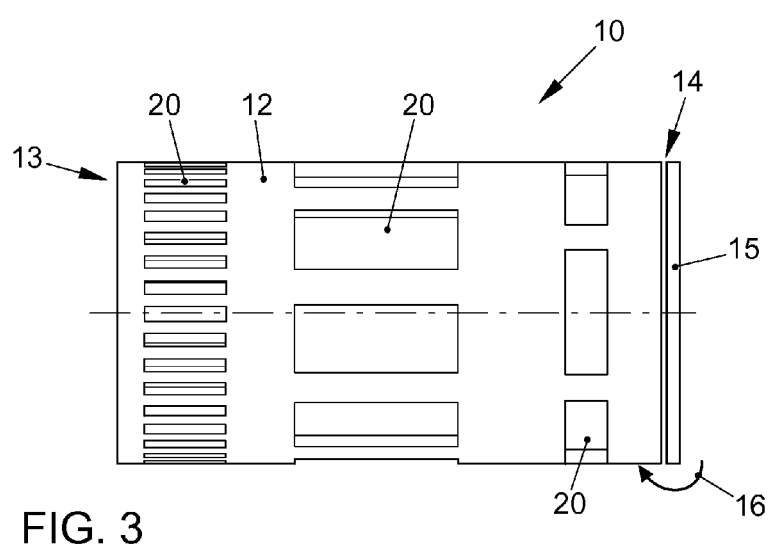
FIG. 3 shows a side view of a misfuelling prevention device according to an embodiment of the present invention.

FIG. 3 shows another embodiment of a misfuelling prevention device 10 in a lateral outside view. The misfuelling prevention device comprises a tubular element 12 with an inflow side 13 and an outflow side 14. Mounted on the outflow side 14 is a closure element 15, which can pivot about a hinge axis (not shown) in the direction of the arrow 16. In the closed state shown, the closure element 15 obstructs a flow of fuel through the outflow side 14. In an open state of the closure element 15, the closure element 15 permits a flow through the outflow side 14. Multiple openings 20 are formed in a lateral surface of the tubular element 12. The openings 20 can be formed in the region of the inflow side 13, in the region of the outflow side 14, and in the run between the inflow side 13 and the outflow side 14, for example. Introduction of fuel at low fueling speeds is possible through the openings 20 even with the closure element 15 closed.

Figure 4:
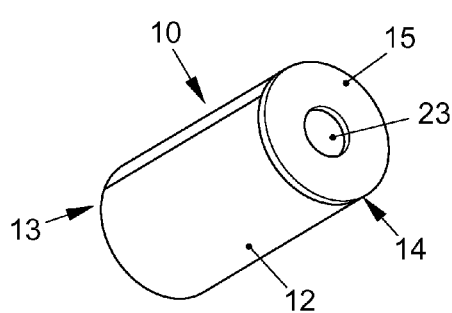
FIG. 4 shows a perspective view of a misfuelling prevention device according to an embodiment of the present invention.
Figure 5:
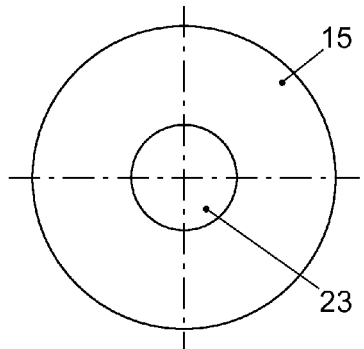
FIG. 5 shows a top view of a closure element of the misfuelling prevention device from FIG. 4.

FIG. 4 shows a perspective view of another misfuelling prevention device 10 for a filler neck of a fuel tank. The misfuelling prevention device 10 comprises a tubular element 12 with an inflow side 13 and an outflow side 14. Mounted on the outflow side 14 is a closure element 15. An opening 23 is formed in the closure element 15. The closure element 15 can hinge about a hinge axis (not shown), so that in the open state it exposes the outflow side 14, and in the closed state closes the outflow side 14 to such a degree that fuel can flow out of the interior of the tubular element 12 essentially only through the opening 23. In this way fueling of the fuel tank at a low rate can be achieved through the opening 23 even when the closure element 15 is closed. FIG. 5 shows a top view of the closure element 15 in an enlarged representation.

Figure 6:
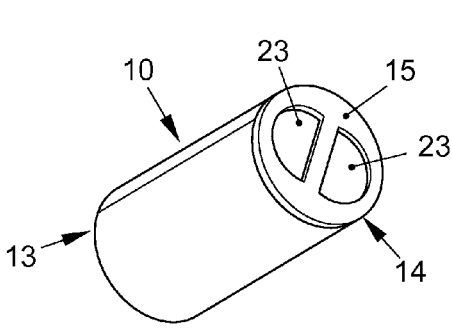
FIG. 6 shows an embodiment of a misfuelling prevention device in a perspective view.
Figure 7:
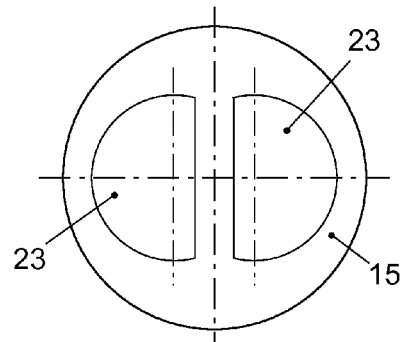
FIG. 7 shows a top view of a closure element of the misfuelling prevention device from FIG. 6.

FIG. 6 shows another misfuelling prevention device 10 that comprises a tubular element 12 with an inflow side 13 and an outflow side 14. Mounted on the outflow side 14 is a closure element 15 with two openings 23 that in an open state permits essentially full flow of fuel through the outflow side 14, and in a closed state permits a flow of fuel only through the openings 23. FIG. 7 shows a top view of the closure element 15 in an enlarged representation. The closure element 15 can be designed as a single part, or alternatively as multiple parts as well. In a multi-part design of the closure element 15, the closure element 15 may comprise two parts, for example, wherein one opening 23 is provided in each part and wherein each part is provided with its own hinge mechanism for opening and exposing the outflow side 14.

Figure 8:
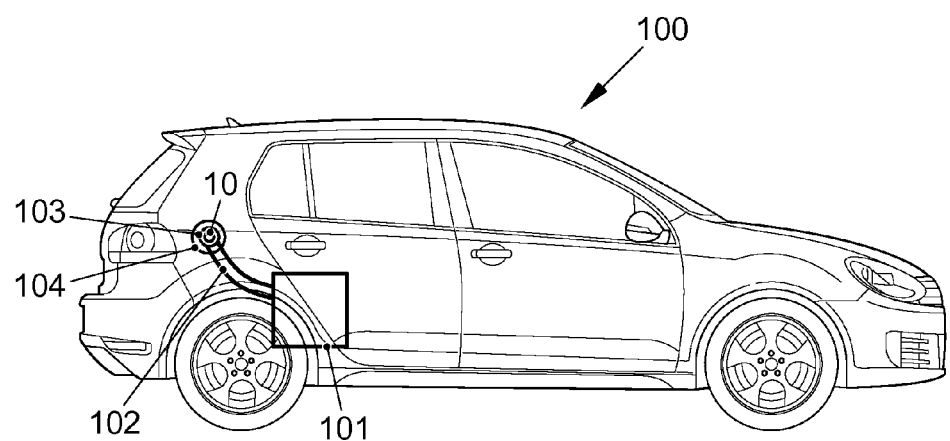
FIG. 8 shows a vehicle with a filler neck and a misfuelling prevention device according to an embodiment of the present invention.

FIG. 8 shows a vehicle 100 with a fuel tank 101. The fuel tank 101 is connected to a filler neck 103 through a line 102. The filler neck 103 is located behind a filler door 104. Inserted in the filler neck 103 is a misfuelling prevention device 10 as described above. The tubular element 12 of the misfuelling prevention device 10 is arranged in the filler neck 103 such that it is possible for fuel to exit through the openings 20-23 into the tank 101. The misfuelling prevention device 10 can be part of the filler neck 103, or can be inserted into the filler neck 103 at a later time by a user of the vehicle as a retrofit. The misfuelling prevention device 10 can have fastening elements 30 (as shown in FIG. 1) for mounting the misfuelling prevention device 10 in the filler neck 103 that make it possible to install and remove the misfuelling prevention device 10, in particular without tools.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A misfuelling prevention device for a filler neck of a fuel tank, comprising:
    a tubular element with an inflow side and an outflow side;
    a closure element that is mounted on the outflow side of the tubular element, the closure element, in an open state, permits a flow of fuel through the outflow side of the tubular element, and, in a closed state, the closure element obstructs a flow of fuel through the outflow side of the tubular element;
    a tubular actuating element that is arranged coaxially within the tubular element so as to be movable in a longitudinal direction of the tubular element, the tubular actuating element being configured to move the closure element into the opened state as a result of actuation by a discharge pipe of a fuel pump nozzle that is inserted into the tubular element; and
    a tubular locking element that is arranged coaxially within the tubular actuating element and has a smaller outside diameter than an inside diameter of the discharge pipe of the fuel pump nozzle,
    wherein the tubular element includes a lateral surface in which is formed at least one opening that permits a flow of fuel from an inside of the tubular element to an outside of the tubular element,
    wherein the tubular element is mountable in the filler neck of the fuel tank such that at least a portion of the lateral surface of the tubular element in which the at least one opening is formed is spaced apart from an inner surface of the filler neck such that fuel flowing through the at least one opening is adapted to flow through the filler neck into the fuel tank,
    wherein the tubular actuating element includes a lateral surface in which is formed at least one opening that permits a flow of fuel from an inside of the tubular actuating element to an outside of the tubular actuating element, and
    wherein the tubular locking element is attached to the tubular actuating element and the tubular locking element is movable in the longitudinal direction of the tubular element.

2. The misfuelling prevention device according to claim 1, wherein the at least one opening of the tubular element is arranged to be offset from the at least one opening of the tubular actuating element.

3. The misfueling prevention device according to claim 1, wherein the tubular locking element includes a lateral surface in which at least one opening is formed that permits a flow of fuel from an inside of the tubular locking element to an outside of the tubular locking element.

4. The misfuelling prevention device according to claim 3, wherein a cross-sectional area of the at least one opening of the tubular element, of the tubular actuating element, of the tubular locking element, and/or of the closure element is chosen to reduce a flow rate through the at least one opening lower than a flow rate of a fuel dispensing facility.

5. The misfuelling prevention device according to claim 1, further comprising a fastening mechanism for coupling the misfuelling prevention device to the filler neck, wherein the fastening mechanism is actuatable from an inside of the tubular element.

6. The misfuelling prevention device according to claim 5, wherein the fastening mechanism is settable to a first state in which the misfuelling prevention device is removable from the filler neck, and settable to a second state in which the misfuelling prevention device is rigidly coupled to the filler neck, wherein the fastening mechanism is selectively adjustable to the first or second state from an inside of the tubular element.

7. A filler neck of a fuel tank, comprising a misfuelling prevention device according to claim 1.

8. A vehicle, comprising:
a filler neck according to claim 7; and
a fuel tank that is coupled to the filler neck.

9. The misfuelling prevention device according to claim 1, wherein the at least one opening of the tubular element and the at least one opening of the tubular actuating element are positioned on a same plane that is perpendicular to the longitudinal direction of the tubular element when the closure element is in the closed state.

10. The misfuelling prevention device according to claim 1, wherein the at least one opening of the tubular element comprises at least two openings, and
wherein the at least two openings are provided at different positions along the longitudinal direction of the tubular element.

11. A misfuelling prevention device for a filler neck of a fuel tank, the misfuelling prevention device comprising:
a tubular element with an inflow side and an outflow side;
a closure element that is mounted on the outflow side of the tubular element, the closure element, in an open state, permits a flow of fuel through the outflow side of the tubular element, and, in a closed state, the closure element obstructs a flow of fuel through the outflow side of the tubular element, the closure element having at least one opening that permits a flow of fuel from an inside of the tubular element to an outside of the tubular element when the closure element is in the closed state;
a tubular actuating element that is arranged coaxially within the tubular element so as to be movable in a longitudinal direction of the tubular element, the tubular actuating element being configured to move the closure element into the opened state as a result of actuation by a discharge pipe of a fuel pump nozzle that is inserted into the tubular element;
a tubular locking element that is arranged coaxially within the tubular actuating element and has a smaller outside diameter than an inside diameter of the discharge pipe of the fuel puma nozzle; and
a fastening mechanism for detachably coupling the misfuelling prevention device to the filler neck,
wherein the tubular locking element is attached to the tubular actuating element and the tubular locking element is movable in the longitudinal direction of the tubular element, and
wherein the tubular actuating element includes a lateral surface in which is formed at least one opening that permits a flow of fuel from an inside of the tubular actuating element to an outside of the tubular actuating element.

12. The misfuelling prevention device according to claim 11, wherein the fastening mechanism is settable to a first state in which the misfuelling prevention device is removable from the filler neck and is settable to a second state in which the misfuelling prevention device is rigidly coupled to the filler neck.

13. The misfuelling prevention device according to claim 11, wherein the at least one opening of the tubular element and the at least one opening of the tubular actuating element are positioned on a same plane that is perpendicular to the longitudinal direction of the tubular element when the closure element is in the closed state.

14. The misfuelling prevention device according to claim 11, wherein the at least one opening formed on the lateral surface of the tubular element comprises at least two openings, and
wherein the at least two openings are provided at different positions along the longitudinal direction of the tubular element.

* * * * *